US007018558B2

(12) United States Patent
Schnur et al.

(10) Patent No.: US 7,018,558 B2
(45) Date of Patent: Mar. 28, 2006

(54) METHOD OF IMPROVING PERFORMANCE OF REFRIGERANT SYSTEMS

(75) Inventors: Nicholas E. Schnur, Cincinnati, OH (US); Bruce J. Beimesch, Crescent Springs, KY (US)

(73) Assignee: Cognis Corporation, Ambler, PA (US)

( * ) Notice: Subject to any disclaimer, the term of this patent is extended or adjusted under 35 U.S.C. 154(b) by 0 days.

(21) Appl. No.: 10/151,458

(22) Filed: May 20, 2002

(65) Prior Publication Data

US 2003/0047707 A1 Mar. 13, 2003

Related U.S. Application Data

(63) Continuation of application No. 09/328,858, filed on Jun. 9, 1999, now abandoned.

(51) Int. Cl.
*C09K 5/04* (2006.01)
(52) U.S. Cl. .............................. 252/68; 508/485; 62/84; 62/468
(58) Field of Classification Search .................. 252/67, 252/68; 62/114, 84, 468; 508/485; 8/67, 8/68
See application file for complete search history.

(56) References Cited

U.S. PATENT DOCUMENTS

| RE19,265 E | 8/1934 | Midgley, Jr. |
| 2,035,541 A | 3/1936 | Fleischer |
| 2,040,902 A | 5/1936 | Zellhoefer |
| 2,084,950 A | 6/1937 | Downing |
| 2,187,388 A | 1/1940 | Williams |
| 2,520,612 A | 8/1950 | Roberts |
| 2,548,493 A | 4/1951 | Robey |
| 2,575,195 A | 11/1951 | Smith, Jr. |
| 2,575,196 A | 11/1951 | Smith, Jr. |
| 2,628,974 A | 2/1953 | Sanderson |
| 2,717,242 A | 9/1955 | Foehr |
| 2,807,155 A | 9/1957 | Williamitis |
| 2,852,470 A | 9/1958 | Henne |
| 2,926,139 A | 2/1960 | Mott |
| 2,958,706 A | 11/1960 | Hurwitz |
| 2,961,406 A | 11/1960 | McNeil, Jr. |
| 2,962,419 A | 11/1960 | Minich |
| 3,135,785 A | 6/1964 | Fritz |
| 3,189,629 A | 6/1965 | Huttenlocher |
| 3,194,791 A | 7/1965 | Wilson |

(Continued)

FOREIGN PATENT DOCUMENTS

AU        252876        12/1960

(Continued)

OTHER PUBLICATIONS

Neopentyl Polyol Ester Lubricants—Bulk Property Optimization; Niedzielski, Edmund; Ind. Eng. Chem., Prod. Res. Dev., vol. 15, No. 1, 1976.

(Continued)

*Primary Examiner*—Margaret Einsmann
(74) *Attorney, Agent, or Firm*—John F. Daniels

(57) ABSTRACT

A method of improving performance of refrigerant systems such as refrigerators and air conditioners that utilize a refrigerant working fluid. The working fluid consists essentially of a heat transfer fluid and a lubricant that is miscible and is otherwise compatible with the heat transfer fluid at all operating temperatures of the refrigerant system. The method is directed particularly to chlorine-free fluoro-group organic fluids and more particularly to hydrofluorocarbon heat transfer fluids. The preferred lubricants comprise polyol ester basestocks and compounded polyol esters that are highly miscible with such hydrofluorocarbon heat transfer fluids.

6 Claims, 7 Drawing Sheets

U.S. PATENT DOCUMENTS

| | | |
|---|---|---|
| 3,202,701 A | 8/1965 | Young |
| 3,282,971 A | 11/1966 | Metro |
| 3,309,318 A | 3/1967 | Aylesworth |
| 3,328,283 A | 6/1967 | Godar |
| 3,328,285 A | 6/1967 | Godar |
| 3,341,574 A | 9/1967 | Taylor |
| 3,441,600 A | 4/1969 | Chao |
| 3,523,084 A | 8/1970 | Chao |
| 3,560,387 A | 2/1971 | Schritt |
| 3,562,300 A | 2/1971 | Chao |
| 3,564,044 A | 2/1971 | Chao |
| 3,694,382 A | 9/1972 | Kleiman |
| 3,773,668 A | 11/1973 | Denis |
| 3,778,454 A | 12/1973 | Kleiman |
| 3,850,824 A | 11/1974 | Nebzydoski |
| 3,855,508 A | 12/1974 | Ross |
| 3,878,112 A | 4/1975 | Luck |
| 3,894,959 A | 7/1975 | Gardiner |
| 3,939,201 A | 2/1976 | Baeskai |
| 4,045,376 A | 8/1977 | Rubin |
| 4,049,563 A | 9/1977 | Burrous |
| 4,053,491 A | 10/1977 | Koch |
| 4,113,642 A | 9/1978 | Koch |
| 4,144,183 A | 3/1979 | Koch |
| 4,155,861 A | 5/1979 | Schmitt |
| 4,159,255 A | 6/1979 | Gainer |
| 4,175,045 A | 11/1979 | Timony |
| 4,178,261 A | 12/1979 | Dhein |
| 4,199,461 A | 4/1980 | Olund |
| 4,212,816 A | 7/1980 | Hentschel |
| 4,234,497 A | 11/1980 | Honig |
| 4,243,540 A | 1/1981 | Mancini |
| 4,248,726 A | 2/1981 | Uchinuma |
| 4,263,159 A | 4/1981 | Berens |
| 4,267,064 A | 5/1981 | Sasaki |
| 4,292,187 A | 9/1981 | Hentschel |
| 4,302,343 A | 11/1981 | Carswell |
| 4,304,678 A | 12/1981 | Schick |
| 4,320,018 A | 3/1982 | Yaffe |
| 4,324,676 A | 4/1982 | Gilbert |
| 4,359,394 A | 11/1982 | Gainer |
| 4,371,577 A | 2/1983 | Sato |
| 4,428,854 A | 1/1984 | Enjo |
| 4,431,557 A | 2/1984 | Shimizu et al. |
| 4,436,641 A | 3/1984 | Stelz |
| 4,440,660 A | 4/1984 | van Rijs |
| 4,454,052 A | 6/1984 | Shoji |
| 4,455,247 A | 6/1984 | Nakayama |
| 4,487,874 A | 12/1984 | Lindner |
| 4,530,772 A | 7/1985 | Timony |
| 4,557,850 A | 12/1985 | Ando |
| 4,559,154 A | 12/1985 | Powell |
| 4,626,959 A | 12/1986 | Shedigian |
| 4,719,025 A | 1/1988 | Akiyama |
| 4,751,012 A | 6/1988 | Ward |
| 4,755,316 A | 7/1988 | Magid |
| 4,758,366 A | 7/1988 | Parekh |
| 4,780,229 A | 10/1988 | Mullin |
| 4,812,262 A | 3/1989 | Shinzawa |
| 4,826,633 A | 5/1989 | Carr |
| 4,851,144 A | 7/1989 | McGraw |
| 4,900,463 A | 2/1990 | Thomas |
| 4,916,914 A | 4/1990 | Short |
| 4,927,554 A | 5/1990 | Jolley |
| 4,938,887 A | 7/1990 | Grava |
| 4,941,986 A | 7/1990 | Jolley |
| 4,944,890 A | 7/1990 | Deeb |
| 4,948,525 A | 8/1990 | Sasaki |
| 4,959,169 A | 9/1990 | McGraw |
| 4,963,282 A | 10/1990 | Jolley |
| 4,971,712 A | 11/1990 | Gorski |
| 4,992,188 A | 2/1991 | Jolley |
| 5,008,028 A | 4/1991 | Jolley |
| 5,021,179 A | 6/1991 | Zehler |
| 5,021,180 A | 6/1991 | McGraw |
| 5,023,007 A | 6/1991 | Grava |
| 5,027,606 A | 7/1991 | Short |
| 5,032,305 A | 7/1991 | Kamakura |
| 5,032,306 A | 7/1991 | Cripps |
| 5,037,570 A | 8/1991 | Gorski |
| 5,053,155 A | 10/1991 | Mahler |
| 5,057,247 A | 10/1991 | Schmid |
| 5,061,550 A | 10/1991 | Shimizu |
| 5,080,816 A | 1/1992 | Sakamoto |
| 5,084,196 A | 1/1992 | Seiki |
| 5,096,606 A | 3/1992 | Hagihara |
| 5,137,650 A | 8/1992 | Kaneko |
| 5,158,698 A | 10/1992 | Jolley |
| 5,185,092 A | 2/1993 | Fukuda |
| 5,202,044 A | 4/1993 | Hagihara |
| 5,211,884 A | 5/1993 | Bunemann |
| 5,229,025 A | 7/1993 | Carter |
| 5,262,076 A | 11/1993 | Ishida |
| 5,273,410 A | 12/1993 | Kitaichi |
| 5,290,465 A | 3/1994 | Sabahi |
| 5,310,492 A | 5/1994 | Seiki |
| 5,342,533 A | 8/1994 | Kondo |
| 5,354,486 A | 10/1994 | Evans |
| 5,369,287 A | 11/1994 | Sunaga |
| 5,391,313 A | 2/1995 | Antika |
| 5,395,544 A | 3/1995 | Hagihara |
| 5,403,503 A | 4/1995 | Seiki |
| 5,445,753 A | 8/1995 | Fukuda |
| 5,447,647 A | 9/1995 | Ishida |
| 5,464,550 A | 11/1995 | Sasaki |
| 5,486,302 A | 1/1996 | Short |
| 5,494,597 A | 2/1996 | Krevalis, Jr. |
| 5,498,356 A | 3/1996 | Kamakura |
| 5,512,198 A | 4/1996 | Sasaki |
| 5,553,465 A | 9/1996 | Fukuda |
| 5,557,944 A | 9/1996 | Hirano |
| 5,560,854 A | 10/1996 | Kaimai |
| 5,612,299 A | 3/1997 | Short |
| 5,620,950 A | 4/1997 | Kamakura |
| 5,648,018 A | 7/1997 | Sabahi |
| 5,653,909 A | 8/1997 | Muraki |
| 5,704,216 A | 1/1998 | Hirano |
| 5,705,086 A | 1/1998 | Ardito |
| 5,711,165 A | 1/1998 | Iizuka |
| 5,716,916 A | 2/1998 | Shiokawa |
| 5,728,655 A | 3/1998 | Muraki |
| 5,804,096 A | 9/1998 | Sato |
| 5,806,336 A | 9/1998 | Sunaga |
| 5,820,777 A | 10/1998 | Schnur |
| 5,830,833 A * | 11/1998 | Grasshoff et al. ........... 508/485 |
| 5,833,876 A | 11/1998 | Schnur |
| 5,853,609 A | 12/1998 | Schnur |
| 5,858,266 A | 1/1999 | Kaneko |
| 5,895,778 A | 4/1999 | McHenry |
| 5,906,769 A | 5/1999 | Schnur |
| 5,964,581 A | 10/1999 | Iizuka |
| 5,976,399 A | 11/1999 | Schnur |
| 5,997,760 A | 12/1999 | Schlosberg |
| 5,997,761 A | 12/1999 | Kaneko |
| 6,029,459 A | 2/2000 | Iizuka |
| 6,153,118 A | 11/2000 | Hasegawa |
| 6,183,662 B1 | 2/2001 | Schnur |
| 6,221,272 B1 | 4/2001 | Schnur |
| 6,221,274 B1 | 4/2001 | Akahori |
| 6,228,820 B1 | 5/2001 | Sakai |
| 6,245,254 B1 | 6/2001 | Corr |
| 6,258,293 B1 | 7/2001 | Iizuka |
| 6,267,906 B1 | 7/2001 | Schnur |
| 6,290,869 B1 | 9/2001 | Sorensen |

| | | |
|---|---|---|
| 6,296,782 B1 | 10/2001 | Schnur |

FOREIGN PATENT DOCUMENTS

| | | |
|---|---|---|
| DE | 17 68 765 | 2/1972 |
| DE | 133 966 | 1/1979 |
| DE | 29 43 446 | 5/1980 |
| DE | 41 05 956 A1 | 8/1992 |
| EP | 089 709 A1 | 9/1983 |
| EP | 195 110 | 9/1986 |
| EP | 227 477 A2 | 7/1987 |
| EP | 272 575 | 6/1988 |
| EP | 315 069 | 5/1989 |
| EP | 336 171 | 10/1989 |
| EP | 359 071 A1 | 3/1990 |
| EP | 377 122 A1 | 7/1990 |
| EP | 378 176 | 7/1990 |
| EP | 379 175 | 7/1990 |
| EP | 384 724 A1 | 8/1990 |
| EP | 406 479 A1 | 1/1991 |
| EP | 415 778 A1 | 3/1991 |
| EP | 430 657 A1 | 6/1991 |
| EP | 435 253 A1 | 7/1991 |
| EP | 440 069 A1 | 8/1991 |
| EP | 445 610 A1 | 9/1991 |
| EP | 445 611 A1 | 9/1991 |
| EP | 448 402 A2 | 9/1991 |
| EP | 449 406 A1 | 10/1991 |
| EP | 452 509 A1 | 10/1991 |
| EP | 458 584 A1 | 11/1991 |
| EP | 461 262 B1 | 12/1991 |
| EP | 468 729 A1 | 1/1992 |
| EP | 479 338 A2 | 4/1992 |
| EP | 480 479 A2 | 4/1992 |
| EP | 485 979 A2 | 5/1992 |
| EP | 485 979 B1 | 5/1992 |
| EP | 498 152 A1 | 8/1992 |
| EP | 522 167 A1 | 1/1993 |
| EP | 536 814 A1 | 4/1993 |
| FR | 2.154.524 | 5/1973 |
| FR | 2.302.290 | 9/1975 |
| GB | 644597 | 10/1950 |
| GB | 662650 | 12/1951 |
| GB | 760490 | 10/1956 |
| GB | 889067 | 2/1962 |
| GB | 892943 | 4/1962 |
| GB | 894639 | 4/1962 |
| GB | 1028402 | 5/1966 |
| GB | 1460665 | 1/1977 |
| GB | 2216541 | 10/1989 |
| JP | 53-136170 | 11/1978 |
| JP | 54-040260 | 3/1979 |
| JP | 55-145638 | 11/1980 |
| JP | 55-155093 | 12/1980 |
| JP | 56-036570 | 4/1981 |
| JP | 56-131548 | 10/1981 |
| JP | 56-133241 | 10/1981 |
| JP | 57-078475 | 5/1982 |
| JP | 58-015592 | 1/1983 |
| JP | 59-021632 | 2/1984 |
| JP | 59-027979 | 2/1984 |
| JP | 59-029625 | 2/1984 |
| JP | 61-062596 | 3/1986 |
| JP | 61-181895 | 8/1986 |
| JP | 62-000592 | 1/1987 |
| JP | 62-290795 | 12/1987 |
| JP | 01-259093 | 10/1989 |
| JP | 01-259095 | 10/1989 |
| JP | 40-085396 | 3/1992 |
| RO | 96079 | 12/1988 |
| RU | 208868 | 2/1968 |
| RU | 1057526 | 11/1983 |
| WO | WO 88/08023 | 10/1988 |
| WO | WO 90/12849 | 11/1990 |
| WO | WO 92/01030 | 1/1992 |
| WO | WO 93/01249 | 1/1993 |
| WO | WO 93/11210 | 6/1993 |
| WO | WO-93/25629 | * 12/1993 |

OTHER PUBLICATIONS

Lubricants and Related Products, pp. 122-125, Klamann, Dieter, 1984.

Synthetic Ester Lubricants; Barnes, R.S. et al.; Lubrication Engineering; Aug. 1957.

New Type Lube Oil for HFC-134a Compressor System; Takeno, T. et al.; 1992.

Synthetic Lubricants (Ch. 10, Neopentyl Polyol Esters); Smith, Thomas; 1962; Midland, Michigan.

Complex Esters of 2,2-Dimethylhydracylic Acid; Lederle, Henry F.; New Haven, CT; Mar. 1969, pp. 70-71.

Grant & Hackh's Chemical Dictionary $5^{th}$ Edition; 1987; pp. 11 and 284.

Hawley's Condensed Chemical Dictionary $11^{th}$ Edition; 1987, p. 214.

H.H. Kruse and M. Schroeder, "Fundamentals of Lubrication in Refrigerating Systems and Heat Pumps," ASHRAE Transactions, vol. 90, Part 2B, KC-84-14, pp. 763-783, Kansas City, Missouri, 1984.

K. Sandvordenker, "Materials Compatibility of R134a in Refrigerant Systems," CFCS: Time of Transition, American Society of Heating, Refrigerating and Air-Conditioning Engineers, Inc., pp. 211-216, Jan. 1989.

Encyclopedia of Polymer Science and Engineering, vol. 4, 1986, p. 360.

C.M. Bosworth, "Predicting the Behavior of Oils in Refrigeration Systems", Refrigerating Engineering (Jun. 1952), pp. 617-621 and 654.

Glenn D. Short, "Synthetic Lubricants and Their Refrigeration Applications", Paper presented at the 44th Annual meeting in Atlanta, GA, May 1-4, 1989.

Diester Compressor Oils in Refrigeration, Fluid & Lubrication Ideas, Fall, 1979 pp. 25, 26.

Chemical Abstracts, vol. 110:215912z (1989).

Chemical Abstracts, vol. 104:227376s (1986) and vol. 104:227379v (1986) and 227382r (1986).

H.O. Spauschus, "Evaluation of Lubricants for Refrigeration and Air-Conditioning Compressors", No. 2, pp. 784-798.

K.S. Sanvordenker et al. "A Review of Synthetic Oils for Refrigeration Use", ASHRAE Symposium Bulletin NA-72-5, Nassau, Bahamas, pp. 14-19 (1972).

Chemical Abstract, vol. 102, No. 2, p. 166, Abstract No. 102:9492u, Jan. 1985.

Emery Inter-Office Memorandum, "Freon 502 Compatibility Testing" (Jan. 1977).

* cited by examiner

METHOD OF IMPROVING PERFORMANCE OF REFRIGERANT SYSTEMS

CROSS-REFERENCE TO RELATED APPLICATIONS

This application is a continuation application of U.S. patent application Ser. No. 09/328,858 filed Jun. 9, 1999 now abandoned.

FIELD OF THE INVENTION

This invention relates to a method or process of improving performance of refrigerant systems such as refrigerators and air conditioners that utilizes a working fluid. The working fluid consists essentially of a chlorine-free fluoro-group containing heat transfer fluid and a lubricant that is miscible phase and is otherwise compatible with the heat transfer fluid over the operating temperature of the system. The heat transfer fluid is preferably a hydrofluorocarbon. The lubricant preferably comprises an ester formed from an alcohol containing at least two —OH groups and a carboxylic acid that is substantially or exclusively monovalent.

BACKGROUND OF THE INVENTION

Refrigerant systems such as refrigerators and air conditioners collectively consume enormous amounts of energy. Energy consumption of refrigerant systems is likely to increase as a result of the replacement of chlorine-containing heat transfer fluids with chlorine-free organic heat transfer fluids for the purpose of protecting the ozone layer.

The replacement of R-22 (difluoromonochloromethane) with a chlorine-free hydrofluorocarbon heat transfer fluid illustrates this problem. R-22 has very good thermodynamic properties resulting in a lower volume replacement per ton of refrigeration than other commercial heat transfer fluids. Accordingly, refrigerant systems utilizing R-22 require less energy than systems utilizing other heat transfer fluids including expected replacement heat transfer fluids for R-22.

An improvement in the performance of refrigerant systems would help alleviate the energy inefficiences resulting from the replacement of chlorine-containing heat transfer fluids with better thermodynamic properties. In fact, even a small improvement in the performance of refrigerant systems can translate into large monetary savings given the enormous amounts of energy being consumed by these systems. Such improvements in performance would also benefit the environment as any reduction in energy requirements will reduce the adverse effect on the environment caused by energy production.

Accordingly, it is an object of this invention to improve the performance of refrigerant systems in terms of reducing their energy requirements. It is also an object to improve such performance with working fluids that are compatible with and remain stable in refrigerant systems over long periods of operation.

SUMMARY OF THE INVENTION

It has now been found that the performance of a refrigerant system such as in air conditioner, refrigerators, freezers, soda fountain dispensers and other cooling device is improved by using working fluids consisting essentially of a heat transfer fluid and lubricant that are miscible over the operating temperature range of the system. This finding applies to a refrigeration system consisting of an apparatus which includes a compressor, a condenser, an expansion device and evaporator in fluid flow relationship. A preferred apparatus is of the sealed compressor type wherein the lubricant which lubricates the moving parts of the refrigeration apparatus is miscible with the heat transfer fluid during the operation of the apparatus.

This finding applies to working fluids consisting essentially of chlorine-free organic heat transfer fluids, preferably hydrofluorocarbons, and lubricants comprising ester base stocks or compounded esters. The ester lubricants are formed from alcohols containing at least two —OH groups and a carboxylic acid that is substantially or completely monovalent. At least part of the acid constituent is preferably formed from straight chain acids of three to six carbon atoms or acids of three to nine carbon atoms with at least one carbon bonded to three other carbon atoms.

The esters are preferably formed from mixtures of alcohols and acids to utilize feedstocks of such mixtures. The lubricant may also comprise mixtures of esters. The lubricant can be formed from only the ester or an ester compounded with one or more additives.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Except in the operating examples, or where otherwise expressly indicated, all numerical quantities in this description indicating amounts of material or conditions of reaction and/or use are to be understood as modified by the term "about" in defining the broadest scope of the invention. Practice of the invention within the boundaries corresponding to the exact quantities stated is preferable however.

Figure 1:
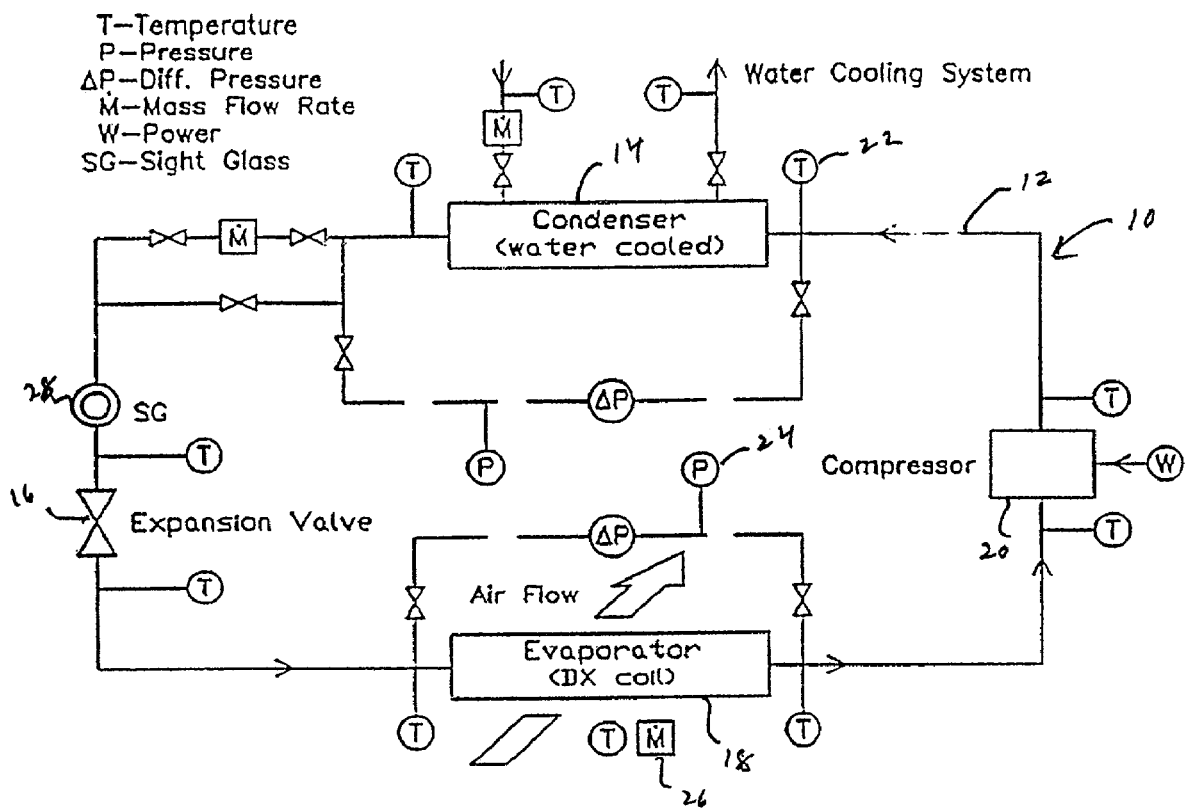
FIG. 1 shows a schematic of the refrigeration system used in the test program.

A typical refrigeration system to which this invention applies is illustrated by the schematic set forth in FIG. 1. Such systems would include air conditioners, refrigerators, freezers, soda fountain dispensers as well as other cooling devices. The schematic of the refrigeration system illustrates a typical operation cycle of a refrigeration apparatus 10 which includes the steps of compression, condensation, expansion and evaporation of a heat transfer fluid. In the apparatus 10, compressed heat transfer fluid carrying some lubricant is discharged through a tube 12 to a condenser 14. The condensed heat transfer fluid and lubricant then pass to an expansion valve 16 and there to an evaporator 18. The evaporator 18 substantially vaporizes the heat transfer fluid and the vapor and liquid phases of the heat transfer fluid and the lubricant are conveyed through tube 12 to a compressor 20. In the compressor 20, the vapor is compressed and discharged through tube 12 for recirculation through the refrigeration apparatus 10. The schematic also indicates the presence of thermocouple probes (T) 22 used to calculate evaporator energy transfer, pressure transducers (P) 24 to measure the absolute pressure (P) and changes in in pressure (ΔP) at the condenser 14 and evaporator 18, a mass flow meter 26 to measure refrigerant flow rate and a sight glass 28. In the refrigeration cycle illustrated by FIG. 1, the liquid phase of the heat transfer fluid and lubricant remain miscible.

The invention is believed to pertain to a substantial variety of heat transfer fluids including both chlorine-free and chlorine-containing organic compounds. Of particular interest are the chlorine-free fluoro-group containing organic compounds, especially hydrofluorocarbons. The most preferred hydrofluorocarbons are difluoromethane, pentafluoroethane, 1,1-difluoroethane, 1,1,1-trifluoroethane, 1,1,1,2-tetrafluoroethane, and mixtures thereof.

The invention relates to lubricants that are miscible and compatible with a heat transfer fluid at all operating temperatures of a refrigerant system. Of particular interest are lubricants that comprise or consist essentially of ester base stocks or esters compounded with additives. The esters suitable for this invention are esters of alcohols that contain at least 2, or more preferably at least 3, —OH groups in unesterified form.

In the preparation of polyol ester lubricants intended to be miscible with chlorine-free fluoro-group containing organic compounds, the use of certain polyols and acids and properties of polyols and acids are preferred as disclosed herebelow. It is preferred, for example, with increasing preference in the order given, that for lower viscosity esters at least 62, 78, or 90 no. % of the alcohol moieties of the esters according to this invention contain no more than 18, more preferably no more than 10, still more preferably no more than 8 carbon atoms. Also independently, it is preferred, with increasing preference in the order given, that at least 62, 81, or 90 no. % of the alcohol moieties in the ester(s) contain at least one carbon atom bonded to four other carbon atoms by single bonds, or in other words, a "neo" carbon atom. Independently and preferably with increasing preference, at least 62, 81, 90 or 98 no. % of the alcohol moieties for the esters are those derived from pentaerythritol, with the formula C—(CH$_2$OH)$_4$, from dipentaerythritol, with the formula (HOCH$_2$)$_3$CCH$_2$OCH$_2$C(CH$_2$OH)$_3$ and from 2,2-dimethyl-1,3-propanediol (more commonly known as neopentyl glycol) with the formula (H$_3$C)$_2$C(CH$_2$OH)$_2$ and from 2,2-dimethylol-1-butanol (more commonly known as "1,1,1-trimethylolpropane" or "TMP"). Independently and preferably with increasing preference that at least 81, 90 or 98% of the alcohol moieties are derived from pentaerythritol or dipentaerythritol. When higher viscosity ester lubricants are needed it is preferred with increasing preference that at least 22, 33, 48 and 68 no. % of the alcohol moieties are derived from dipentaerythritol.

Unsaturated as well as saturated alcohols may be used for esters according to this invention. Saturated alcohols are preferred. Also, substituted alcohols as well as unsubstituted alcohols may be used, but it is preferred that the alcohols used have no substituents other than alkoxy groups, fluoro groups, and/or chloro groups. As with the acids or acyl groups to be used for esters according to this invention, generally unsubstituted alcohols are more economical and are most preferred for that reason.

The carboxylic acids used to make the ester preferably contain a sufficient fraction of acyl groups that satisfy at least one of the following two criteria. The acyl groups must either contain nine carbon atoms or less and include at least one carbon atom bonded to three other carbon atoms by single bonds and/or be straight chain with three to six carbon atoms. In order for the esters to satisfy the miscibility requirements of the invention, it is preferable that at least 22 number percent (hereinafter "no. %") of the acyl groups in the ester or ester mixtures that are lubricants and/or base stocks according to the invention meet at least one of these criteria. With increasing preference in the order named the no. % of acyl groups meeting one or both of these criteria would be at least 33, 42, 50, 67, 86, or, for low viscosity lubricants, 92.

Additionally and independently, the no. % of acyl groups containing at least nine carbon atoms will not be greater than 81, or with increasing preference not greater than 67, 56, 45 or 33. It is also preferred that at least 90 no. % of the acyl groups in all the esters used according to the invention have no more than twenty carbon atoms each.

Either pure esters or mixtures of esters meeting the above criteria may be effectively used in many embodiments of the invention. Generally, mixtures of esters are more economical, because they may be prepared from commercially available starting materials without costly purification as a prerequisite. In one embodiment of the invention, mixtures of esters are preferred for performance reasons as well as economy. Where moderate to high viscosity lubricants are needed, it is preferred with increasing preference that at least 12, 16, 21, 29, 33 or 40 no. % of the acyl groups in the esters to be used for the invention contain at least 7, more preferably at least 8 and most preferably 9 carbon atoms each. The preferred acid with 8 carbons is 2-ethylhexanoic acid and with 9 carbon atoms is 3,5,5-trimethylhexanoic acid.

A highly desirable constituent is the tetraester of pentaerythritol with an acid mixture of 57 weight percent iso- or i-pentanoic acid, which for purposes of the specification is defined as a mixture of n-pentanoic acid, 2-methylbutanoic acid, and 3-methylbutanoic acid with 43 weight percent 3,5,5-trimethylhexanoic acid. Additionally and independently, iso- or i-pentanoic acid may with increasing preference make up at least 3, 5, 7, 11 or 14 no. % as needed to improve the miscibility of the ester lubricant with the heat transfer fluid.

Generally, mixtures of acids are preferred. For most purposes the preferred acids are acids having 5, 7 and 9 carbon atoms. It is preferred with increasing preference that at least 60, 68, 75, 81, 92 and 98 no. % of the acyl groups have 5, 6, 7, 8, 9, 10, or more preferably 5, 7, or 9 carbon atoms or and even more preferably have 5 or 9.

For lubricants and/or base stocks according to the invention in the lower viscosity ranges, substantially all of the acyl groups in the esters are preferably monovalent ones. For higher viscosity ranges, some divalent acyl groups are preferred, as it is believed that esters containing two or more alcohol moieties joined by such divalent acyl groups, with all the other hydroxyl positions on the alcohols corresponding to those esterified by monoacyl groups, are particularly advantageous types of esters for use according to this invention. (An "alcohol moiety" in any ester is defined herein as a connected part of the ester that would remain if all acyl groups were removed from the ester. An acyl group may be denoted herein as an "acid moiety" in an ester). If one or more of the acyl groups in an ester is divalent, the ester is denoted herein as a "complex ester"; such esters preferably include two alcohol moieties, which may be the same or different, but are both of the type already described below. Esters according to the invention with only one alcohol moiety and with all monovalent acyl groups may be denoted herein as "single polyol esters".

An independent constraint on the ratio between monovalent and higher valency acids to be reacted is that too large a fraction of acids with more than one valence may result in an undesirable amount of high molecular weight polymer, in view of the fact that all or substantially all of the alcohol(s) to be reacted also have at least two reactive groups. For this reason, it is increasingly preferred that the ration of equivalents from monovalent acids to the equivalents from divalent or higher valent acids reacted be at least 1, 1.76, or 2.69. Also, the amount of acyl groups with valence higher than 2 preferably is no more than 2 no. % of the total of all acyl groups.

It is preferred, with increasing preference in the order given, that at least 55, 67, 81, or 92 no. % of the divalent acyl groups in esters used according to this invention have from 4 to 12, or more preferably from 6–9 carbon atoms, and it is independently preferred, with increasing preference in the order given, that at least 55, 67, 81, or 92% of the monovalent acyl groups in the esters contain no more than 18, more preferably no more than 9, still more preferably no more than 7, carbon atoms.

Additionally and independently, it is desirable that for adequate solubility in highly fluorinated refrigerant heat transfer fluids, the ratio of the no. % of acyl groups in the ester(s) that contain 8 or more carbon atoms and are unbranched to the no. % of acyl groups in the ester(s) that are both branched and contain not more than six, preferably not more than five, carbon atoms will not be greater than 1.56, more preferably not greater than 1.21, or still more preferably not greater than 1.00.

Saturated and unsaturated acyl groups may both be used, but saturated ones are preferred. Also, substituted as well as unsubstituted acyl groups may be used in esters according to the invention, but it is preferred that the acyl groups have no substituents other than alkoxy, fluoro and/or chloro groups. Generally unsubstituted acyl groups are most economical and are most preferred for that reason.

Independently of all other preferences, it is increasingly more preferred that no more than 20, 14, 9, 5 and 2 no. % of the oxygen atoms in the esters to be used in a composition according to the invention be chemically bonded (as distinct from "hydrogen bonded") to a hydrogen atom.

For each of the esters which form the lubricant composition of the invention, it is possible to obtain the same esters by reacting acid derivatives such as acid anhydrides, acyl chlorides, and esters of the acids instead of reacting the acids themselves. The acids are generally preferred for economy and are exemplified herein, but it is to be understood that the esters defined herein by their reactive components with acids can be equally well obtained be reaction of alcohols with the corresponding acid derivatives.

Concerning the reactive components of the esters which form the lubricant composition of the invention, it is to be understood that although only the desired alcohols and acids are explicitly specified, some amount of the sort of impurities normally present in technical or industrial grade products may be tolerable in most cases. For example, "tech pentaerythritol" (PE) normally contains on the order of 85–90 weight % of mono PE, along with 10–15 weight % of di-pentaerythritol ("DPE") and 0–3% of tripentaerythritol ("TPE"), and is quite satisfactory for making high quality esters in many cases. Also, "commercial isopentanoic acid" normally contains about 65 weight % n-pentanoic acid and about 35 weight % of isopentanoic acids selected from the group consisting of 2-methylbutanoic acid and 3-methylbutanoic acid.

In practice, it has been found that reaction between the alcohol(s) and the acid(s) reactants of the respective esters proceeds more effectively if the quantity of acid charged to the reaction mixture initially is enough to provide an excess of 10–25% of equivalents of acid over the equivalents of alcohol reacted with the acid. (An equivalent of acid is defined for the purposes of this description as the amount containing one gram equivalent weight of carboxyl groups, whereas an equivalent of alcohol is the amount containing one gram equivalent weight of hydroxyl groups.) The composition of the mixture of acids and alcohols that have actually reacted can be determined by analysis of the ester product for its acyl group content.

In making the ester product, according to this invention, the acid reacted will be lower boiling than the alcohol(s) reacted and the product ester(s). When this condition obtains, it is preferred to remove the bulk of any excess acid remaining at the end of the esterification reaction by distillation, most preferably at a low pressure such as 1–5 torr.

After such vacuum distillation, the product is often ready for use as a lubricant blending stock according to this invention. If further refinement of the products is desired, the content of free acid in the product after the first vacuum distillation may be further reduced by treatment with epoxy esters, as taught in U.S. Pat. 3,485,754 or by neutralization with any suitable alkaline material such as lime, alkali metal hydroxides, or alkali metal carbonates.

If treatment with epoxy esters is used, excess epoxy esters may be removed by a second distillation under very low pressure, while the product of reaction between the epoxy ester and residual acid may be left behind in the product without harm. If alkali neutralization is used as the refinement method, subsequent washing with water, to remove any unreacted excess fatty acid neutralized by the alkali, is strongly preferred before using the product is forming a lubricant ester blend.

Under some conditions of use, the ester base stock described herein will function satisfactorily as a complete lubricant. It is generally preferably, however, for a complete lubricant to contain other materials generally known in the art as additives, such as oxidation resistance and thermal stability improvers, corrosion inhibitors, metal deactivators, lubricity additives, viscosity index improvers, pour and/or floc point depressants, detergents, dispersants, foam promoting agents, antifoaming agents, anti-wear and extreme pressure resistance additives and acid scavengers. Many additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total compounded lubricant formulation.

An effective amount of the foregoing additive types is generally in the range of 0.01 to 5% for the antioxidant compound, 0.01 to 5% for the corrosion inhibitor component, from 0.001 to 5% for the metal deactivator component, from 0.5 to 5% for the lubricity additives, from 0.01 to 2% for each of the viscosity index improvers and pour and/or floc point depressants, from 0.1 to 5% for each of the detergents and dispersants, from 0.001 to 0.1% for foam promoting agents or anti-foam agents, and from 0.1–2% for the anti-wear and extreme pressure resistance components; and 0.05 to 2% for the acid scavenger. All these percent are by weight and are based on the total weight of the lubricant composition. It is to be understood that more or less than the stated amounts of additives may be more suitable to particular circumstances or applications, and that a single molecular type or a mixture of types may be used for each type of additive component.

The foregoing examples are intended to be merely illustrative and not limiting, except as circumscribed by the appended claims.

Examples of suitable oxidation resistance and thermal stability improvers are diphenyl-, dinaphthyl- and phenylnaphtyl-amines, in which the phenyl and naphthyl groups can be substituted, e.g., N,N'-diphenyl phenylenediamine, p-octylidiphenylamine, p,p-dioctyldiphenylamine, N-phenyl-1-naphthyl amine, N-phenyl-2-naphthyl amine, N-(p-dodecyl)-phenyl-2-napthyl amine, di-1-naphthylamine, and di-2-naphthylamine; phenothiazines such as N-alkylphenothiazines, imino(-bisbenzyl); and hindered phenols such as 6-(t-butyl) phenol, 4,4'-methylenebis(-2,6-di-(t-butyl) phenol), and the like.

Examples of suitable cuprous metal deactivators are imidazole, benzamidazole, 2-mercaptobenzthiazole, 2,5-dimercaptothiadizaole, salicylidine-propylenedeiamine, pyrazole, benzotriazole, tolutriazole, 2-methylbenzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., n-oleyl-sarcosine, sorbitan monooleate, lead naphthenate, dodecenyl-succinic acid and its partial esters and amides, and 4-nonylphenoxy acetic acid; primary, secondary, and tertiary aliphatic and cyloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives and alkenyl succinic anhydrides or acids, dithiocarbamates, dithiophosphates, amine salts of alkyl acid phosphates and their derivatives.

Examples of suitable lubricity additives include siloxane polymers, polyoxyalkene polymers, polyalkyleneglycol and long chain derviative of fatty acids and natural oils, such as esters, amines, amides, imidazolines, and borates.

Examples of suitable viscosity index improvers include polymethacrylates, polybutenes, styrene-acrylate copolymers and ethylene-propylene copolymers.

Examples of suitable pour point and/or floc point depressants include polymethacrylates such as methacrylate-ethylene-vinyl acetate terpolymers; alkylated naphthalene derivatives, and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and methyl salts of alkyl sulfides, of alkyl phenols, and of condensation products of alkyl phenols and aldehydes.

Examples of suitable anti-foam agents include silicone polymers, siloxane polymers and polyoxyalkene polymers and some acrylates.

Examples of foam promoters include silicone polymers with a different molecular structure than the silicone polymers used as anti-foam agents, siloxane polymers and polyoxyalkene polymers.

Examples of suitable anti-wear and extreme pressure resistance agents include sulfurized fatty acids and fatty acid esters, such as sulfurized octyl tallate; sulfuirized terpenes; sulfuirized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

Examples of suitable acid scavengers are epoxy compounds having at least one epoxy compound in its molecule. Preferred acid scavengers are compounds having at least one glycidyl ester group including aliphatic glycidyl ethers such as propylene glycol, diglycidyl ether, neopentyl glycol diglycidyl ether, 1,4-butanediol diglycidyl ether and 1-propanol diglycidyl ether; aromatic glycidyl ethers such as phenyl glycidyl ether, cresyl glycidyl ether and glycidyl ether of bisphenol A—alkylene oxide adduct and polyalkylene glycol diglycidyl ether. In the diglycidyl ether of polyalkylene glycol or other alkylene oxide adducts, preferable constitutive alkylene groups are ethylene, propylene, butylene, etc. and the preferable molecular weight thereof is 1000 or less.

Under some conditions of operation, it is believed that the presence in lubricants of the types of polyether polyols that have been prominent constituents of certain prior art lubricant base stocks reported to be useful with fluorocarbon refrigerant working fluids are less than optimally stable and or inadequately compatible with some of the most useful lubricant additives. Thus, in one embodiment of this invention, it is preferred that the lubricant base stocks and lubricant be substantially free of such polyether polyols. By "substantially free", it is meant that the compositions contain no more than about 10% by weight, preferably no more than about 2.6% by weight and more preferably no more than about 1.2% by weight of the materials noted.

In formulating a refrigerant working fluid according to this invention, the selected heat transfer fluid and the lubricant components of the working fluid should have chemical characteristics and be present in such a proportion to each other that the lubricant remains, miscible with the heat transfer fluid over the entire range of working temperatures to which the working fluid is exposed during operation of a refrigeration system in which the working fluid is used. Such systems vary enormously in terms of their operating conditions. Accordingly, it is often adequate if the working fluid remains miscible up to +30° C., although it is increasingly more preferable if the working fluid remains miscible up to 45°, 60°, 71° and at least 100° C. Similarly, it is often adequate if the working fluids remain miscible when chilled to 0° C., although it is increasingly more preferable if the working fluids remain miscible down to −15°, −27°, −42°, −50°, −57° and −60° C. Miscible working fluids consisting essentially of chlorine-free fluoro-group containing heat transfer fluids and blended ester lubricants can be obtained as described above. Miscibility over a temperature range for working fluids containing up to 1, 2, 4, 10 and 15% by weight of lubricant is successively more preferable.

In the practice of the invention, working fluids consisting essentially of a refrigerant heat transfer fluid and lubricant base stock or compound lubricant is used in a process of operating refrigerant systems in such a manner that the working fluid improves performance of the refrigerant system.

The operable and preferred ranges of viscosity and variation of viscosity with temperature for lubricant compositions according to this invention are generally the same as established in the art for lubricants to be used in refrigeration systems together with a heat transfer fluid, particularly for a fluorocarbon and/or chlorofluorocarbon heat transfer fluid. In general, as noted above, it is preferred that lubricants according to this invention have International Organization for Standardization ("ISO") viscosity grade numbers between 15 and 320. The Viscosity ranges for some of the ISO viscosity grade numbers are given in Table 1.

TABLE 1

| ISO Viscosity Grade Number | Viscosity Range in Centistokes at 40° C. | |
|---|---|---|
| | Minimum | Maximum |
| 2 | 1.98 | 2.42 |
| 3 | 2.88 | 3.53 |
| 5 | 4.14 | 5.06 |
| 7 | 6.12 | 7.48 |
| 10 | 9.00 | 11.0 |
| 15 | 13.5 | 16.5 |
| 22 | 19.8 | 24.2 |
| 32 | 28.8 | 35.2 |
| 46 | 41.4 | 50.6 |
| 68 | 61.2 | 74.8 |
| 100 | 90.2 | 110 |
| 150 | 135 | 165 |
| 220 | 198 | 242 |
| 320 | 288 | 352 |
| 460 | 414 | 506 |
| 680 | 612 | 748 |
| 1000 | 900 | 1100 |
| 1500 | 1350 | 1650 |

The preparation of ester lubricant base stocks of the invention is described in further detail in the following examples.

General Ester Synthesis Procedure

The alcohol and acid to be reacted, together with a suitable catalyst such as dibutyltin diacetate, tin oxalate, phosphoric acid, and/or tetrabutyl titanate, were charged into a round bottomed flask equipped with a stirrer, thermometer, nitrogen sparging means, condenser, and a recycle trap. Acid was charged in about 15% molar excess over the alcohol. The amount of catalyst was from 0.02 to 0.1% by weight of the weight of the total acid and alcohol reacted.

The reaction mixture was heated to a temperature between about 220 and 230° C., and water from the resulting reaction was collected in the trap while refluxing acids were returned to the reaction mixture. Partial vacuum was maintained above the reaction mixture as necessary to achieve a reflux. The reaction mixture was sampled occasionally for determination of hydroxyl number, and after the hydroxyl number had fallen below 5.0 mg of KOH per gram of mixture, the majority of the excess acid was removed by distillation after applying the highest vacuum obtainable with the apparatus used, while lowering the temperature to about 190° C. The reaction mixture was then cooled, and any residual acidity was removed, if desired, by treatment with lime, sodium hydroxide, or epoxy esters. The resulting lubricant or lubricant base stock was dried and filtered before blending and phase compatibility testing.

EXAMPLE 1 AND A

Two refrigerant working fluids were tested in a vapor compression refrigeration system similar to that described in FIG. 1. One of these fluids (Example A) comprises a heat transfer fluid and a mineral oil lubricant known to be immiscible with the heat transfer fluid. The mineral oil is an Iso 32 naphthentic refrigeration oil. The second working fluid (Example 1) comprises a lubricant comprising a polyol ester which is known to be miscible with the heat transfer fluid. The heat transfer fluid used in both Examples A and 1 is 1,1,1,2-tetrafluoroethane (R134a). The polyol ester of Example 1 is formed from pentaerythritol and a mixture of 37 weight percent n-pentanoic acid, 20 weight percent of a mixture of 2-methylbutanoic acid and 3-methylbutanoic acid and 43 weight percent 3,5,5-trimethylhexanoic acid.

These refrigerant working fluids were tested in a vapor-compression refrigeration system similar to that used in actual buildings. This system is designed to provide approximately 3 tons of refrigeration. The refrigeration system schematic is shown in FIG. 1. The major components of the refrigeration system are as follows:

Evaporator

The evaporator is a cross-flow refrigerant coil. The refrigerant flows through copper tubes, with air flowing across the tubes. Air-side heat transfer is enhanced with aluminum fins mounted on the copper tubes.

In the initial testing, the refrigeration system had a coil in which inside of the copper tubes is smooth tube (smooth-tube coil) and the tests were conducted on this coil. However, later tests were performed on an evaporator coil with micro-fin tubes (microfin-tube coil). Both coils have the same design capacity of 10.5 kW (3 tons), but they differ in physical characteristics as the microfin-tube coil is smaller than the smooth-tube coil.

The smooth tube coil has ⅝ inch nominal outer diameter copper tubes with twelve fins per inch (12 fpi), while the microfin-tube coil has ⅜ inch copper tubes with 15 fpi. The microfin tube coil has around 25 percent smaller cross-sectional area than the smooth-tube coil cross-sectional area. Also, the volume of the microfin-tube coil on the refrigerant side is about 70 percent smaller than the same volume for the smooth-tube coil.

Compressor

The compressor is a hermetically-sealed constant-speed reciprocating type, designed to operate with HFC-134a refrigerant. The compressor has accessible plugs for charging and draining lubricant so that oil changes can be performed while the compressor is still installed.

Expansion Valve

There are two expansion devices installed in the refrigeration system, namely a thermostatic expansion valve and a needle valve. Since the thermo-expansion valve has a slow response time, the needle valve is the preferred device for flow rate control as described in Crown, S. W., H W Shapiro and M. B. Pate. 1992. *A comparison study of the thermal performance of R-12 and R-134a.* "International Refrigeration Conference—Energy Efficiency and the New Refrigerants" (1): 187–196 (hereafter the "Crown et al article"). In addition, the needle valve can be directly controlled by the data acquisition system.

INSTRUMENTATION

Measuring devices used to quantitatively evaluate refrigeration system performance are also shown in FIG. 1. The sensors installed are thermocouple probes, pressure transducers, flow sensors, and a watt transducer. A detailed description of each of those sensors is provided below.

Thermocouple Probes

Thermocouple probes are of the T type, and they are located before and after each of the components of the refrigeration system. All of the thermocouples were calibrated, and the uncertainty of their reading is ±0.21° C. (0.5 F).

In addition, there are two thermocouple grids before and after the evaporator on the air flow side. Each grid consists of 18 thermocouples equally spaced across the heat exchanger cross-sectional area. The purpose of these grids is to accurately calculate evaporator energy transfer on the air side. Dry and wet bulb thermocouples are installed before and after the evaporator for the purpose of measuring the amount of moisture in the air stream.

Pressure Transducers

Four pressure transducers installed in the refrigeration system are used to measure absolute pressure. All of the pressure transducers were calibrated with a dead weight tester over the expected range of operation. The pressure transducer uncertainty is estimated to be ±1.05 kPa (0.15 psia).

Mass Flowmeter

The refrigerant flow rate is measured with a mass flowmeter that was precalibrated by the manufacturer. For accurate flow rate measurements, it is required that refrigerant be in a liquid state at the outlet of the condenser, which is where the flowmeter is located. If the liquid phase requirement is met, the flowmeter can read actual flow rate with an uncertainty of ±0.0075 kg/min (0.0034 lbm/min).

Pitot-Tube Measuring Station

The air flow rate is measured with a Pitot-tube measuring station which uses a calibrated pressure transducer to measure dynamic pressure.

Turbine Flowmeter

The flow rate of the water flowing through the condenser is measured by a calibrated turbine flowmeter. The flowmeter can measure the water flow rate with an uncertainty of ±0.05 kg/min (0.0225 lbm/min).

Watt Transducer

A watt transducer precalibrated by the manufacturer is used to measure compressor power consumption with a listed uncertainty of ±0.05 kW (4 Btu/min).

Data Acquisition System

The data acquisition system consists of a computer, an IEEE-488 GPIB (General Purpose Interface Bus) controller card, a computer addressable digital voltmeter, and two scanners. The GPIB controller card allowed for computer control of the scanners and the voltmeter. All of the instruments were connected to the data acquisition system, allowing constant updating of the system operating parameters and storing of the information in the computer memory.

In order to compare the system performance for different types of working fluids, testing and data taking must be done at the same operating conditions. Therefore, it was necessary to define an operating point by assigning values to the independent parameters. Six different parameters could be controlled during testing, and, as such, they can be considered to be independent parameters. Four out of six independent parameters were kept constant:

1. Superheat at the compressor inlet is necessary so that the refrigerant entering the compressor is in the vapor phase, thus preventing any damage to the compressor. The refrigerant vapor was superheated 7.5° C. (13.5 F) above the saturation temperature corresponding to the suction pressure. This value is representative of the superheat used in the industry for refrigeration system applications.
2. Refrigerant charge was investigated by operating the system over a wide range of conditions for the case of the POE lubricant. As the refrigerant charge was found to be an optimum at 3.6 kg (8 lbm), this same charge was used for all tests.
3. Condenser water flow rate was kept constant at a maximum value, which corresponds to approximately 80 kg/min (175 lbm/min) of water mass flow rate. At high water flow rates, the condenser performance becomes independent of the water flow rate magnitude due to a negligible thermal resistance between the water and the tube wall as described in Incropera F. P. and D. P. De Witt, 1990 *Fundamentals of heat mass transfer*, third edition, New York: John Wiley & Sons. Thus, the water flow rate was removed as a variable during system testing and analysis, and as a result, the condenser performance becomes only a function of water inlet temperature, refrigerant flow rate, and refrigerant temperatures as described in the Crown et al article.
4. Air volumetric flow rate was kept constant at approximately 1.3 m$^3$/sec (2400 CFM). This flow rate magnitude is close to the maximum achievable air flow rate in the test facility and is kept constant so that it is not a variable in this study.
5. Four different condenser water inlet temperatures were selected for investigating the refrigeration system performance. These temperatures are 18.5° C. (65 F), 24° C. (75 F), 32° C. (90 F), and 40.5° C. (105 F), and they correspond to water temperatures readily available and used in refrigeration applications.
6. The three different evaporator air inlet temperatures selected were 13° C. (55° F.), 18.5° C. (65° F.), and 24° C. (75° F.) which represents a wide range of working temperatures for air-conditioning applications.

Combinations of these two independent variables produced 12 different operating points representing a large range of operating conditions. Determining the refrigeration system performance over this large range of conditions is considered important for the working fluid baseline data for working fluids comprising the polyol ester (POE) lubricant of Example 1 and mineral oil of Example A.

In order to control the six independent parameters referenced hereabove, the system is first charged with refrigerant to an optimum amount. The condenser water is was circulated at a constant volume flow rate by operating pump at its maximum capacity. The air flow rate was set by adjusting the fan motor speed to achieve a constant air stream dynamic pressure.

In order to control the remaining three independent parameters simultaneously, the condenser water temperature is controlled by mixing the chilled water with the condenser return water. The air inlet temperature was kept at a desired value by reheating the air leaving the evaporator by using a combination of a steam coil and an electric heater. The electric heater is used to accurately control the air temperature while the steam coil was used to produce the bulk of the cooling load. Finally, a needle valve was used to control the refrigerant flow rate through the system which in turn adjusts the amount of superheat at the compressor exit.

After the steady state operation has been reached, the data are taken over an approximately 5 minute period. Multiple readings of several key parameters were taken in order to reduce any precision errors in instrumentation readings. These multiple readings were statistically processed to access the fluctuations in instrument readings.

The experimental procedures adopted for changing the lubricant in the refrigerant system are important in order to ensure that the refrigerant lubricant in the compressor is of an acceptable purity.

The lubricant oil change was performed in accordance with the triple-flush procedure outlined in Byrne J. J., M Shows and M. W. Abel. *Investigation of flushing and cleanout methods for refrigeration equipment to ensure system compatibility*. Final report. ARTI MLLR Project Number 660-52502. The triple-flush is a method for the removal of the mineral oil from an installation containing R-12 when it is retrofitted with HFC-134a. The same procedure was used in this project to replace the polyolester refrigerant lubricant with the mineral oil. The method requires three lubricant changes to remove any traces of residual mineral oil which reduces the residual oil to less than 1 percent by volume.

An industry recognized indicator of refrigerant system performance is the coefficient of performance (COP). Coefficient of performance is defined as the useful energy transfer (i.e., evaporator capacity) divided by the energy consumed. The coefficient of performance was measured for working fluids of Examples 1 and A for air inlet temperatures of 13° C., 18° C. and 24° C. and for condenser water inlet temperatures of 18.5° C., 24° C., 32° C. and 40.5° C. The results of these measurements are set forth in Table 2. In Table 2, the working fluid of Example 1 is identified as "POE lubricant" and the working fluid of Example A is identified as "Mineral Oil".

Figure 2:
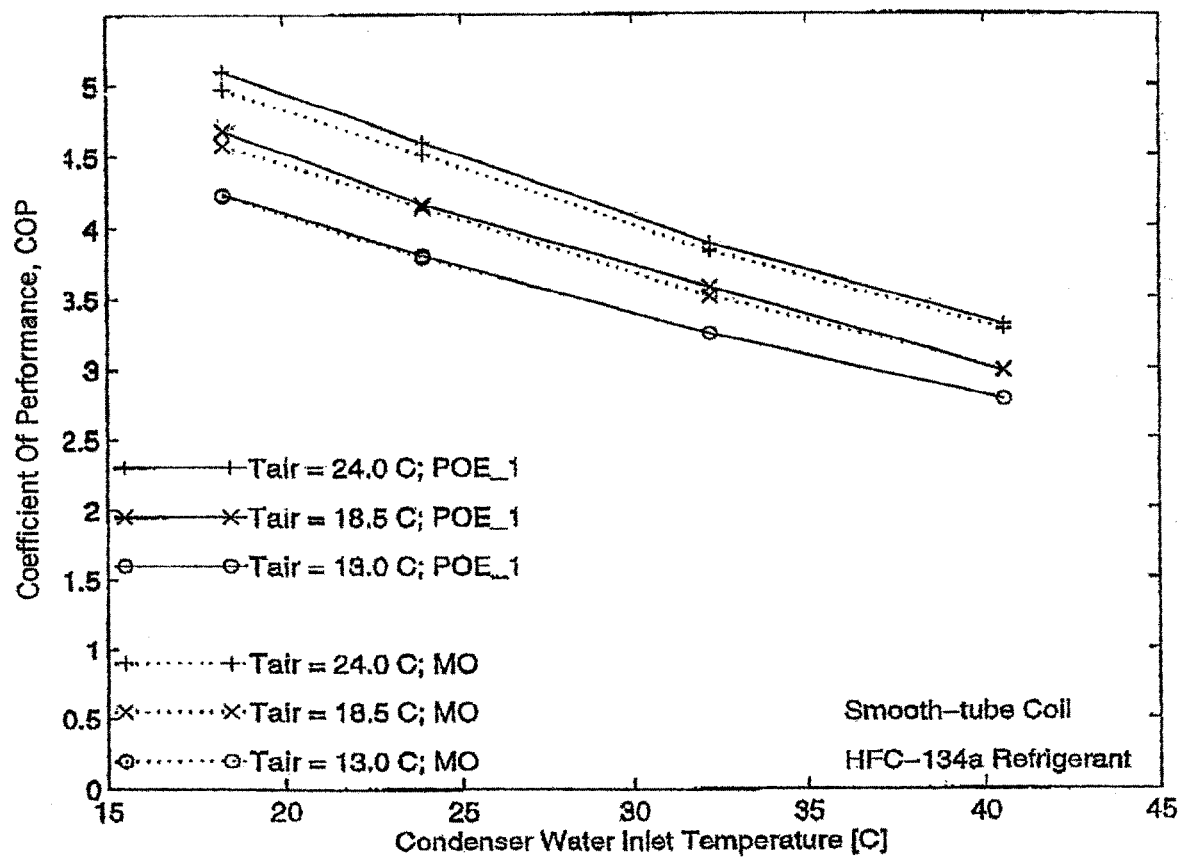
FIG. 2 is a graph showing coefficient of performances of a smooth tube coil type refrigerant apparatus using miscible working fluid of Example 1 compared with coefficient of performance for the same apparatus using immiscible working fluid of Example A.

As shown in FIG. 2 the refrigerant system operation is more efficient with the POE lubricant. This is illustrated by the relatively higher unbroken lines representing COP results with the miscible working fluid of Example 1 (identified as "POE 1") in the dotted lines for the COP results for the immiscible working fluid of Example A (identified as "MO"). This result indicates that the performance of refrigerant systems is improved by the use of miscible refrigerant working fluids and that such performance improvement results in energy savings.

FIG. 2 also indicates that COP can vary greatly due to varying air and water temperatures. These differences are illustrated by establishing a reference point corresponding to an air temperature of 13° C. and a water temperature of 18.5° C. It can then be observed that an increase in air temperature from the reference point of 13° C. to 24° C., while keeping the same condenser water temperature, results in approximately a 25 percent COP increase. If the water temperature is increased from 18.5° C. to 40° C. than the COP decreases around 40 percent. Although changes in air and water inlet temperatures have a considerable effect on COP, at the temperature conditions tested, the COP for the refrigerant system was with only one exception higher with the miscible working fluid of Example 1.

Figure 3:
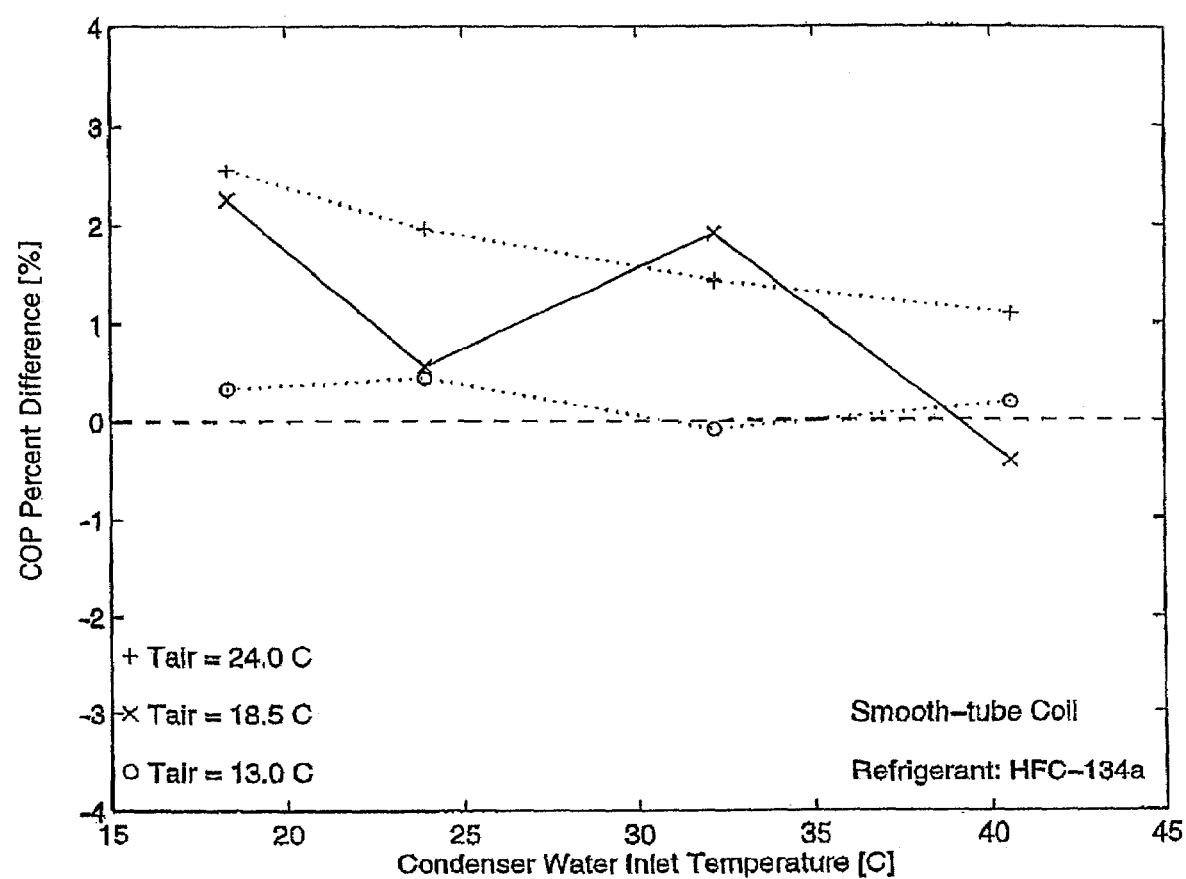
FIG. 3 is a graph showing the percentage difference in coefficient of performances of a smooth tube type refrigerant apparatus using miscible working fluid of Example 1 compared with coefficient of performance for the same apparatus using immiscible working fluid of Example A.

The results plotted in FIG. 2 can also be presented as a percent difference as shown in FIG. 3. The percent COP difference, $COP_{dif}$, is defined as the difference between the COPs for the miscible working fluid with the POE lubricant and the immiscible working fluid with the mineral oil divided by the COP for the miscible working fluid. The value is expressed as a percentage.

$$COP_{dif}[\%] = \frac{COP_{POE} - COP_{m\text{-}oil}}{COP_{m\text{-}oil}} \times 100 \quad (1)$$

Using this approach, the results plotted in FIG. 3 also show that the system operating with the miscible working fluid (POE lubricant) has a larger COP than the system operating with the immiscible working fluid (Mineral oil). As noted previously, the percent differences are as high as 2.5 percent. It appears from FIG. 3 that the largest percent differences correspond to the points with the highest evaporator temperature of 24° C. (75° F.) with the COP percent difference diminishing to a fraction of a percent as the evaporator air entering temperature decreases.

These results suggest that for an air conditioning application operating with air entering at 24° C. (75° F.) there is a $25 potential saving for every $1000 spent on operating the refrigeration system using a miscible working fluid in the compressor in place of an immiscible working fluid.

These tests were repeated for the microfin-tube coil in the same manner as for the smooth-tube coil. Specifically, effects of miscible and immiscible working fluids on coefficient of performance of the same refrigeration apparatus with a micro-fin coil used in place of the smooth-tube coil were investigated by comparing the refrigeration system operating points corresponding to the same independent parameters (i.e. refrigerant charge; air and water inlet temperatures; air and water flow rates; and amount of superheat at the compressor inlet). The data obtained are set forth in FIG. 4 and indicate similar system behavior for two types of coils.

As with the smooth-tube coil, the system operates more efficiently with the miscible working fluid (POE) lubricant than with the immiscible working fluid (MO) with the microfin-tube coil. As already determined for the smooth-tube coil, the COP data shows that there are energy savings related to the utilization of a miscible working fluid in the micro-fin tube system.

Figure 4:
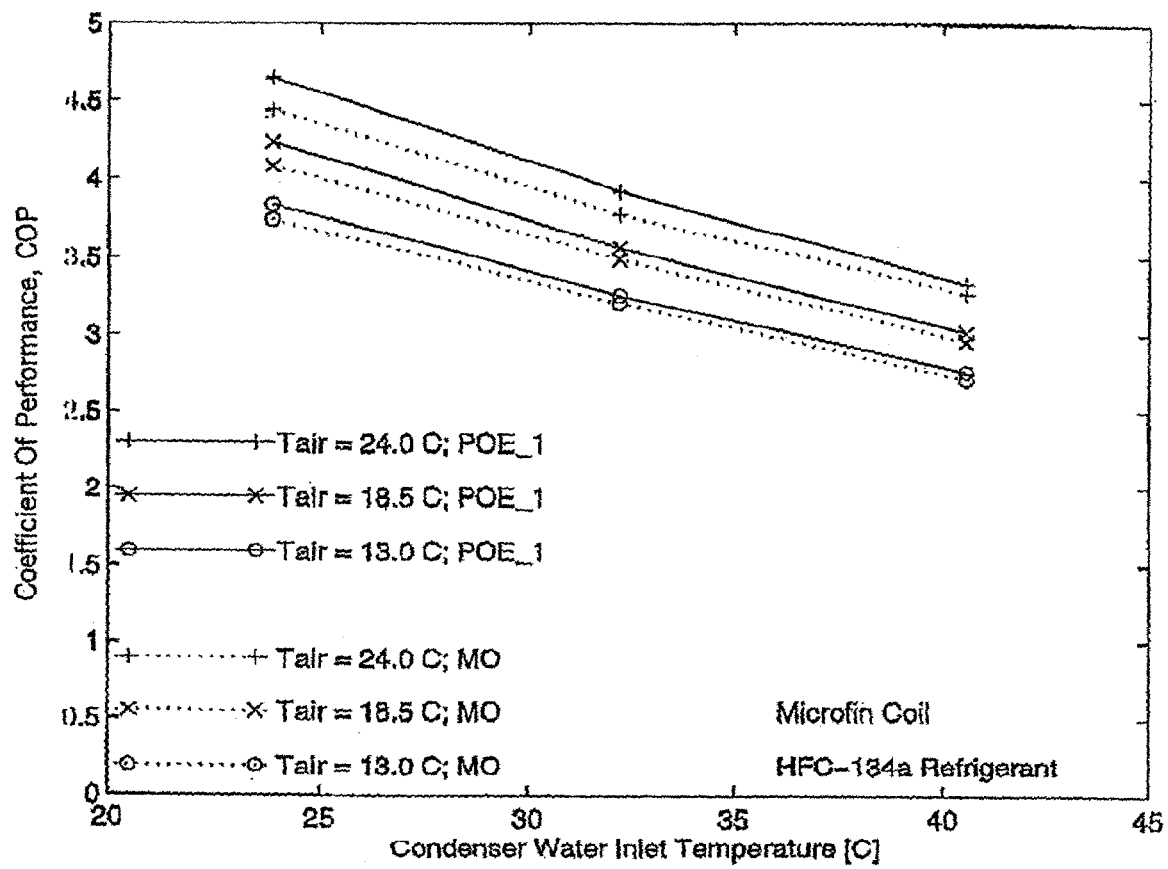
FIG. 4 is a graph showing coefficient of performances of a micro-fin tube type refrigerant apparatus using a miscible working fluid of Example 1 compared with coefficient of performance for the same apparatus using immiscible working fluid of Example A.

FIG. 4 also reveals substantial differences in COP due to variations in water and air temperatures. For instance the COP decreases for 25 percent if the water temperature is increased from 24° C. to 40° C., and it also decreases for around 20 percent if the air temperature is reduced from 24° C. to 13° C. Only for a condenser water temperature of 40° C. (105° F.) are there no distinguishable difference among COP percent differences for different air temperatures. Yet, the COP for the refrigerant system was higher for the miscible working fluid of Example 1 for all test conditions.

Figure 5:
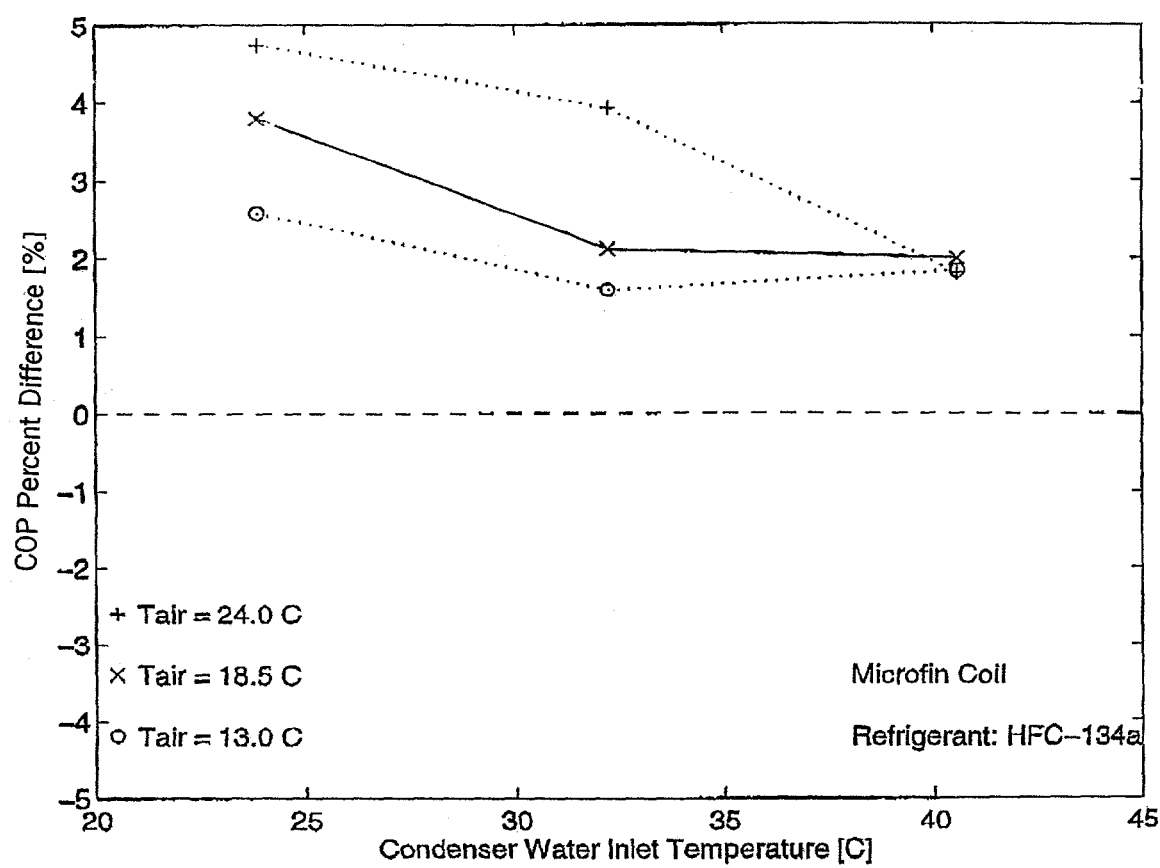
FIG. 5 is a graph showing the percentage difference of coefficient of performance of a micro-fin tube type refrigerant apparatus using a miscible working fluid of Example 1 compared with coefficient of performance for the same apparatus using immiscible working fluid of Example A.

The percent COP difference, $COP_{dif}$ defined earlier, in formula (1) is obtained from the COP results in FIG. 4. The $COP_{dif}$ results expressed in percentage are set forth in FIG. 5. Using this approach, the results demonstrate that the system operating with the immiscible working fluid (POE lubricant) has a larger COP than the system operating with the miscible working fluid (Mineral oil). The COP percent differences are as high as about 4.5 percent, and the largest percent differences correspond to the points with the highest evaporator temperature 24° C. (75° F.) and the lowest condenser water temperature 24° C. (75° F.). The COP percent difference appears to decrease with an increase in water temperature and a decrease in air temperature.

These results suggest that for an air conditioning application operating with air entering at 24° C. (75° F.), for every $1,000 spent on operating the refrigeration system there is a $45 potential saving in utilizing the miscible working fluid over the immiscible working fluid in the compressor. Accordingly, the possible energy savings related to usage of the miscible working fluid with the microfin-tube coil are even higher than the energy savings found for the smooth-tube coil. This result is especially significant because microfin coils are being used increasingly in refrigerant systems.

EXAMPLE 2

Figure 6:
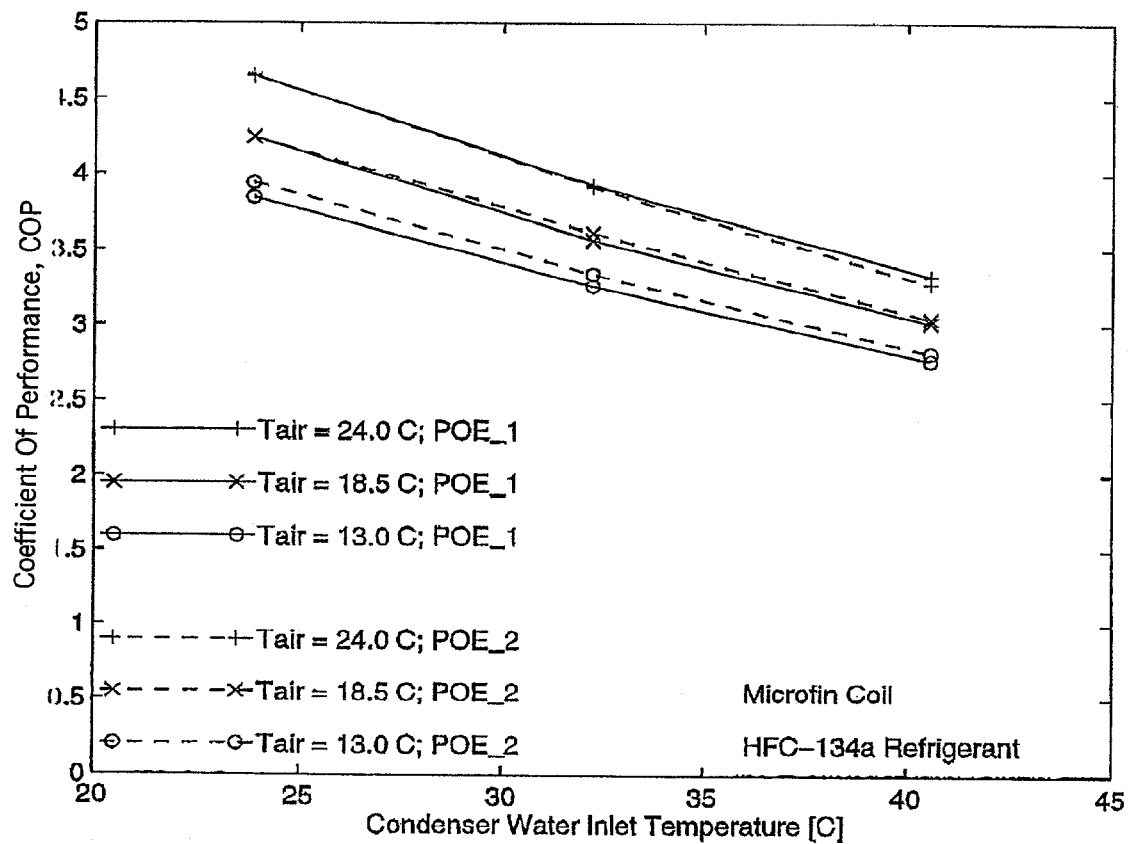
FIG. 6 is a graph showing coefficient of performance of a micro-fin tube type refrigerant apparatus using a miscible working fluids of Example 1 and 2.

The coefficient of performance was measured for refrigeration apparatus described hereabove using a second miscible working fluid comprising 1,1,1,2-tetrafluoroethane heat transfer fluid and a second polyol ester lubricant (POE #2). The second polyol ester is formed from an alcohol mixture of 65 weight percent pentaerythritol and 35 weight percent dipentaerythritol and a mixture of straight chain acids of 5 to 10 carbon atoms present in the following ranges (53–63 no. % $nC_5$; 5–15 no. % $nC_6$; 7–17 no. % $nC_7$; 7–17 no.% $nC_8$; 0–10 no. % $nC_9$ and 0–10 no. % $nC_{10}$. The conditions under which the coefficient of performance was measured for this Example 2 working fluid were the same as those for the working fluids of Examples 1 and A. The comparative results for COP for the miscible working fluids of Examples 1 and 2 (expressed as POE #1 and #2) are shown in FIG. 6.

Figure 7:
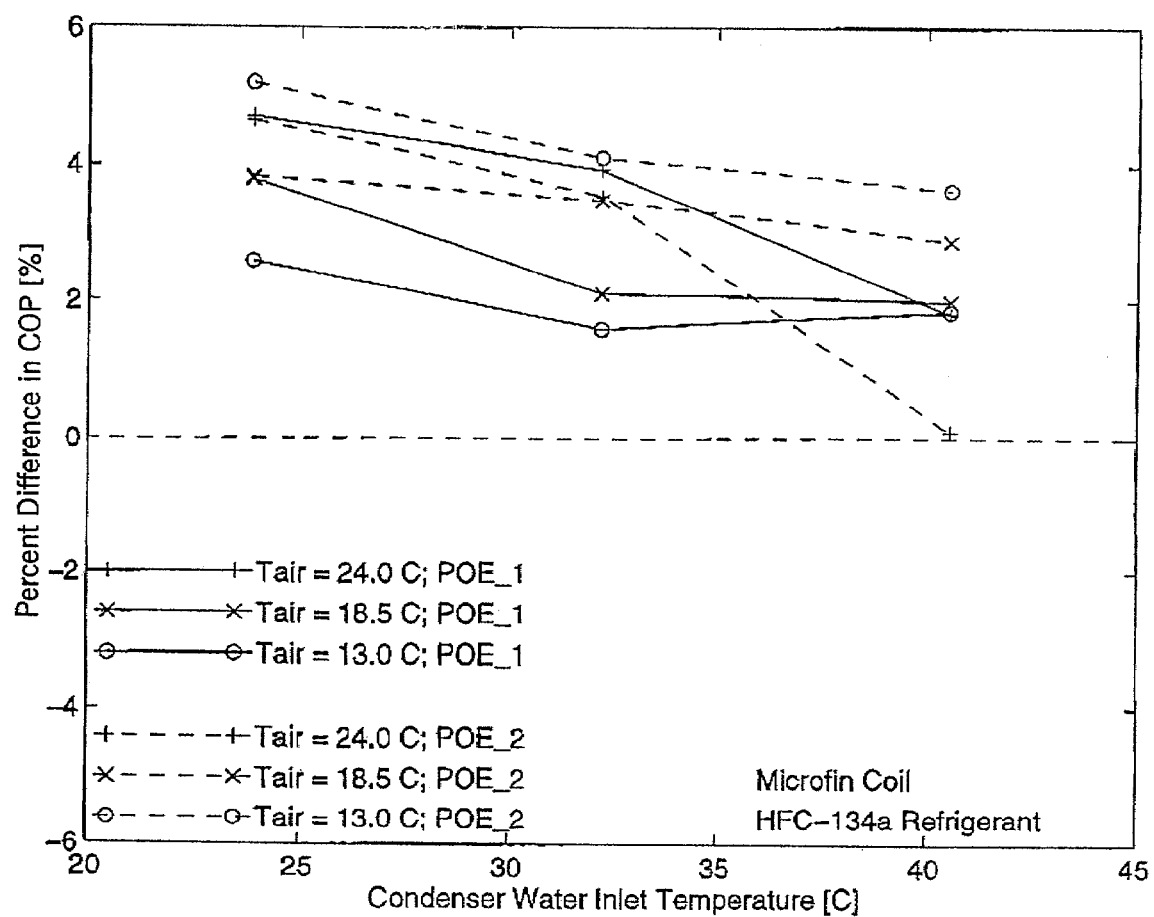
FIG. 7 is a graph showing the percentage differences of coefficient of performance of a micro-fin tube type refrigerant apparatus using a miscible working fluids of Examples 1 and 2 compared with coefficient of performance for the same apparatus using immiscible working fluid of Example A.

The coefficient of performance results of the working fluids of Examples 1 and 2 are defined relative to the immiscible working fluid of Example A in terms of a percent difference in FIG. 7 by calculating these differences according to formula (1). The COP percent differences for working fluid of Examples 1 and 2 (i.e., POE #1 and POE #2) are plotted in FIG. 7 as functions of condenser water temperature and evaporator air temperature. The COP percent difference data indicate that the miscible working fluid of Example 2 improves the COP of a refrigerant system relative to the immiscible working fluid of Example A. Specifically, the COP percent improvement for the miscible working fluid of Example 2 over the immiscible working fluid of Example A varied from 0.1 to 5.2%. These results suggest that for an air conditioning application operating with air entering at 13° C. that is a $52 potential saving for every $1,000 spent on operating the refrigeration system using a miscible working fluid in the compressor in place of an immiscible working fluid. The COP percent improvement for the miscible working fluid of Example 1 over the immiscible working fluid of Example A varied from 1.6 to 4.7%. The COP percent difference values which are plotted in FIG. 7 and discussed above are also given in Table 2. The fact that the COP percent differences are all positive (the largest 5.2%) shows that for all test conditions, refrigerant system performance was improved with the use of miscible working fluids.

TABLE 2

COP Percent Differences for two POE Lubricants.

| | Tcond = 23.9 C. | | Tcond = 32.2 C. | | Tcond = 40.6 C. | |
|---|---|---|---|---|---|---|
| | POE #1 | POE #2 | POE #1 | POE #2 | POE #1 | POE #2 |
| Tair = 13.0 C. | 2.58 | 5.20 | 1.58 | 4.11 | 1.83 | 3.64 |
| Tair = 18.5 C. | 3.79 | 3.83 | 2.10 | 3.49 | 1.99 | 2.88 |
| Tair = 24.0 C. | 4.74 | 4.68 | 3.93 | 3.55 | 1.80 | 0.10 |

What is claimed is:

1. A process of improving by at least 2.5% the coefficient of performance of a refrigerant system utilizing a working fluid and comprising a compressor, a condenser, an expansion device and an evaporator, the process comprising employing in the system a working fluid consisting essentially of esters of alcohols consisting essentially of pentaerythritol and di-pentaerythritol and carboxylic acids consisting essentially of a mixture of $nC_5$, $nC_6$, $nC_7$ and $nC_8$ acids and including at least one additive selected from the group consisting of oxidation resistance and thermal stability improvers, corrosion inhibitors, metal deactivators, lubricity additives, viscosity index improvers, pour and/or floc point depressants, detergents, dispersants, foam promoting agents, anti-foaming agents, anti-wear and extreme pressure resistance agents and acid scavengers, and that is miscible with the heat transfer fluid over the entire operating conditions of the system compared with a mineral oil lubricant that is not miscible over the operating conditions of the system.

2. A process according to claim 1, wherein the chlorine-free fluoro-group organic heat transfer fluid is 1,1,1,2-tetrafluoroethane.

3. A process of improving by at least 2.5% the coefficient of performance of a refrigerant system utilizing a working fluid and comprising a compressor, a condenser, an expansion device and an evaporator, the process comprising employing in the system a working fluid consisting essentially of a chlorine-free fluoro-group organic heat transfer fluid and a lubricant composition consisting essentially of esters of alcohols consisting essentially of pentaerythritol and di-pentaerythritol and carboxylic acids, consisting essentially of a mixture of $nC_5$, $nC_6$, $nC_7$ and $nC_8$ acids and additives comprising at least one antiwear and extreme pressure resistance agent and that is miscible with a heat transfer fluid over the entire operating conditions of the system, compared with a mineral oil lubricant that is not miscible with the heat transfer fluid over the operating conditions of the system.

4. A process of improving by at least 2.5% the coefficient of performance of a refrigerant system utilizing a working fluid and comprising a compressor, a condenser, an expansion device and an evaporator, the process comprising employing in the system a working fluid consisting essentially of a chlorine-free fluoro-group organic heat transfer fluid and a lubricant composition consisting essentially of esters of alcohols consisting essentially of pentaerythritol and di-pentaerythritol and carboxylic acids consisting essentially of a mixture of 53–63% $nC_5$, 5–15% $nC_6$, 7–17% $nC_7$, 7–17% $nC_8$, 0–10% $nC_9$ and 0–10% $nC_{10}$ acids, including at least one additive selected from the group consisting of oxidation resistance and thermal stability improvers, corrosion inhibitors metal deactivators, lubricity additives, viscosity index improvers, pour and/or floc point depressants, detergents, dispersants, foam promoting agents, anti-foaming agents, anti-wear and extreme pressure resistance agents and acid scavengers, and that is miscible with the heat transfer fluid over the entire operating conditions of the system compared with a mineral oil lubricant that is not miscible with the heat transfer fluid over the operating conditions of the system.

5. A process according to claim 4, wherein the chlorine-free fluoro-group organic heat transfer fluid is 1,1,1,2-tetrafluoroethane.

6. A process of improving by at least 2.5% the coefficient of performance of a refrigerant system utilizing a working fluid and comprising a compressor, a condenser, an expansion device and an evaporator, the process comprising employing in the system a working fluid consisting essentially of a chlorine-free fluoro-group organic heat transfer fluid and a lubricant composition consisting essentially of esters of alcohols consisting essentially of pentaerythritol and di-pentaerythritol and carboxylic acids comprising consisting essentially of a mixture 53–63% $nC_5$, 5–15% $nC_6$, 7–17% $nC_7$, 7–17% $nC_8$, 0–10% $nC_9$ and 0–10% $nC_{10}$ acids and at least one antiwear and extreme pressure resistance agent selected from the group consisting of sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, amine salts of phosphoric acid monohexyl ester, amine salts of dinonyl-naphthalene sulfonate, triphenyl phosphate, trinaphthyl phosphate, diphenyl cresyl and dicresyl phenyl phosphates, naphthyl diphenyl phosphate, triphenylphosphorothionate, dithiocarbamates, such as an antimony dialkyl tithiocarbamate; chlorinated and/or fluorinated hydrocarbons, and xanthates and that is miscible with the heat transfer fluid over the entire operating conditions of the system compared with a mineral oil lubricant that is not miscible with the heat transfer fluid over the operating conditions of the system.

* * * * *